S. W. ROBINSON & De V. WOOD.
Machines for Drilling Rock.
No. 5,285. Reissued Feb. 18, 1873.
Fig. 1.
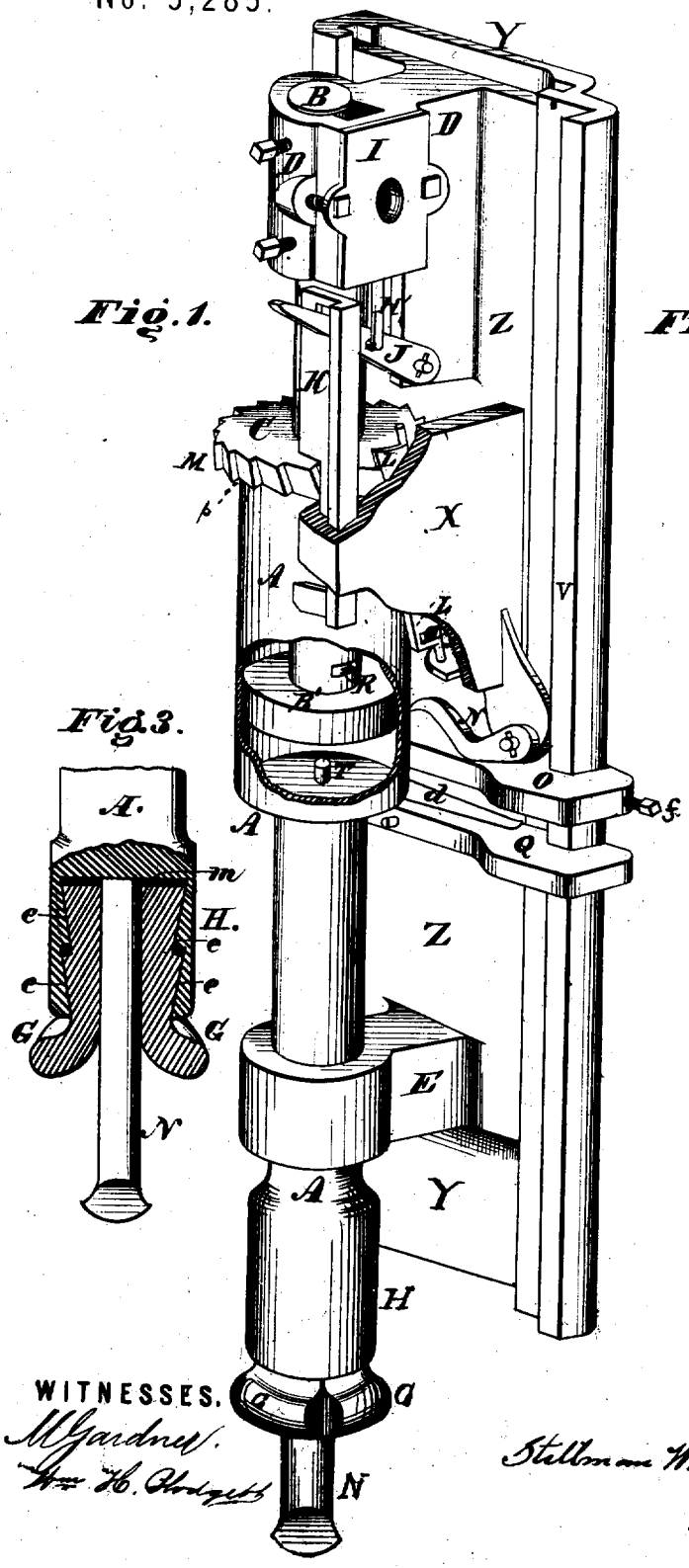
Fig. 2.
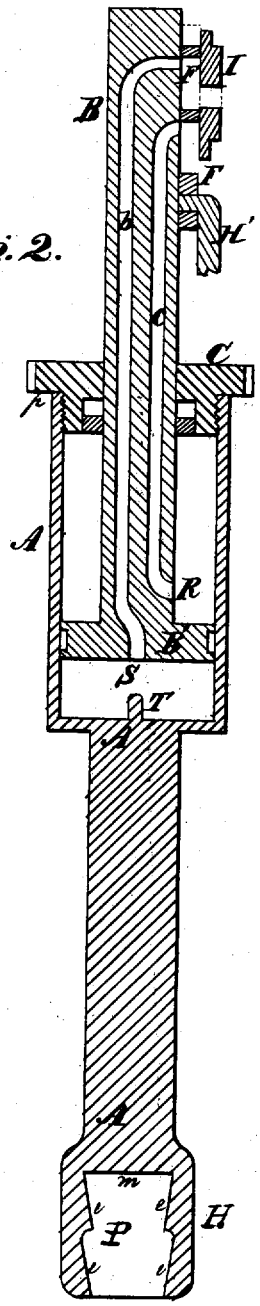
Fig. 3.
WITNESSES.
M. Gardner.
Wm. H. Hodgetts
INVENTOR.
Stillman W. Robinson & De Volson Wood
per Edw. W. Donn
Attorney.

UNITED STATES PATENT OFFICE.

STILLMAN W. ROBINSON, OF CHAMPAIGN, ILLINOIS, AND DE VOLSON WOOD, OF ANN ARBOR, MICHIGAN.

IMPROVEMENT IN MACHINES FOR DRILLING ROCK.

Specification forming part of Letters Patent No. 71,329, dated November 26, 1867; reissue No. 5,285, dated February 18, 1873.

*To all whom it may concern:*

Be it known that we, STILLMAN W. ROBINSON, formerly of the city of Ann Arbor, county of Washtenaw, and State of Michigan, but now of Champaign, Champaign county, in the State of Illinois, and DE VOLSON WOOD, of the former place, have invented certain Improvements in Rock-Drills, of which the following is a specification, reference being had to the annexed drawing, in which—

Figure 1 is a perspective view of the machine, and Fig. 2 is a longitudinal section of the same through the center of the cylinder and piston-rod. Fig. 3 is a longitudinal section of the tool-holder shown in Fig. 1.

The nature of our improvement consists in the employment of a reciprocating cylinder for driving the drill; also, of an improved tool-holder; also, of an improved automatic feed; and, also, of an improved device for rotating the tool.

A A is a steam-cylinder, which has no steam-ports or steam-passages, and which is made steam-tight about the head and piston-rod by any of the well-known ways. The forward end of the cylinder is somewhat prolonged so as to form the tool-holder, as hereafter described. The cylinder is also free to reciprocate over the piston and piston-rod. The tool may be rotated by rotating the cylinder, as will be hereafter described; and the cylinder also operates the valve and feed device. Such a cylinder, which, for convenience, is here called a drill-bar, is used for driving and operating the tool. The piston-rod B is firmly secured at its rear end to the projection D of the carriage Z in any convenient manner, and serves as a support and guide to the cylinder A. There may also be an additional support and guide, E. The piston-rod also contains the steam-passages *b* and *c*, one of which enters the cylinder at R a short distance back of the piston, and the other enters it in front of the piston at S. The other ends of the steam-passages enter the steam-chest, and the movement of the steam to and from the cylinder is regulated by the valve F. The movement of the valve F is regulated by the reciprocation of the drill-bar A in any convenient manner.

By the arrangement above described the cylinder, piston-rod, and piston may all be easily made of wrought-steel or wrought-iron, thus rendering them very durable and not likely to break. This arrangement also secures a more compact drill than has been before made, it being shorter for the same length of stroke and the same amount of bearing between the piston-rod and cylinder than any other drill, which is very desirable in portable drills. By this arrangement, also, the whole shock produced by the blow is received by the drill-bar, and the steam-packing, which is usually placed on the piston, is not subjected to shocks.

To prevent the forward head of the cylinder from striking the piston at the end of the back stroke of the cylinder the plug T enters the port S, thus automatically closing it and retaining a portion of the motor, which acts as an elastic cushion or spring for bringing the cylinder to rest. In a similar way the port R may be automatically closed by the rear head of the cylinder passing over it near the end of the forward stroke, and a cushion thus formed.

The tool-holder is made as follows: A hollow cone, P, which is shown in section in Fig. 2, is made in the forward end H of the drill-bar A A. Into this cone are fitted several conical wedges, G G, Fig. 1, the outer surfaces of which have the same slope as the inner surface *e e* of the hollow cone P; and between the inner surfaces of the wedges a cylindrical passage is formed to receive the head of the tool N. Any number of wedges may be used; but we have found three to be the most convenient number. On account of the sloping surfaces *e e* the wedges, as they are drawn outward, will be forced toward the axis of the cone, so as to partly close the cylindrical space between them before referred to. If the tool N is inserted and the wedges are thus drawn out they will press upon the tool and hold it by friction.

By this arrangement the tool may be automatically seized as follows: When the tool N, Fig. 1, strikes the rock it is forced back against the bottom of the cone, which is shown at *m*, Fig. 2, thereby suddenly stopping the advance of the drill-bar A A; but if the wedges G G are loose they will pass on and wedge in between the head of the tool and the surface of the cone, as before stated, and thus hold the tool. This arrangement of the cone and wedges also permits different-sized drill-heads to be used.

Rotation of the drill-bar is secured as follows: A long click, L L, is pivoted at its ends so as so rotate about its back edge, and its working-edge is somewhat spiral and inclined to the axis of the drill-bar, and is forced into bearing by a spring, *a*. During the back stroke of the drill-bar the click L L engages the teeth of the ratchet M on the rear head of the cylinder and causes a partial rotation of the drill-bar; but during the advance stroke, there being nothing to cause rotation, the click falls into the next tooth. The back of the click may be nearly parallel to the working-edge.

As the cutting advances the machine is fed forward so as to follow up with the work. The main feature of the feed consists in using the reaction of the motor in the cylinder during the back stroke to force the machine forward on the ways. A rapid feed may also be secured by using the momentum of the drill-bar, as hereafter described.

The carriage Z Z, to a projection of which the piston-rod is attached, as before stated, may move along the ways Y Y when there is nothing to prevent. When it is desirable to hold the machine in position the gripe Q so operates as to prevent a back movement; and O, in a similar manner, prevents a forward movement, as hereafter explained. The gripe Q has a notch near one end so as to bind upon the rib V, while the other end is secured to the carriage Z in any convenient manner. The end which bears on the rib is pressed forward by a spring, *d*. When this gripe is in bearing it prevents the machine from moving back in the ways. O is a similar gripe to prevent a forward movement; but, instead of a spring like *d*, it is held in any desired position by friction, which may be induced by a screw, *f*, or in any other convenient manner.

The cylinder-head C projects beyond the circumference of the cylinder, and has a ratchet, M, (before referred to,) on its edge. The lower side *p* of the projection serves as a tappet.

When the cutting has advanced so far that a forward feed is necessary the tappet *p*, at the end of the forward stroke, strikes the lever N, which, by pressing against the gripe O, drives the outer end of said gripe forward on the rib V, where it is retained by friction, as before stated. The carriage Z Z is now free to move forward the same amount that the gripe O has been advanced. Now, as the motor enters the rear end of the cylinder to drive backward, the reaction of the motor on the piston—which reaction is the same in amount as the pressure on the rear cylinder-head—forces the piston and all attached to it forward as far as is permitted by the new position of the gripe O. The gripe Q, being thus carried forward to the advanced position, holds the carriage Z Z and all attached so that it cannot return to its old position. When the cutting advances rapidly the gripe O is advanced more frequently, or is advanced more at each blow, or both at the same time, thus admitting of a rapid feed. In this way the feed is perfectly automatic. By freeing the gripe Q while O is in bearing a back feed may be secured in the same way.

A momentum feed may be secured as follows: If, from any cause, the drill does not strike the rock—as, for instance, if, at the beginning of work, the drill is too far from the rock—the head of the cylinder, near the end of the forward stroke, automatically closes the port R, and retains a portion of the motor, which now acts as a spring, as before explained; and at the same time the tappet *p* drives the lever N and gripe O forward, as before explained; while the momentum of the drill-bar and all attached, acting upon the piston at or near the end of the forward stroke, forces the piston and carriage and all attached to it forward on the ways Y Y, where they are retained by the gripe Q, as before described, thus securing a rapid feed until the tool strikes the rock, after which the reaction feed comes into action.

In these feeds the gripes O and Q do not force the feed on the ways. Their office is to regulate the feed.

We do not confine ourselves to these particular devices, as we have used in practice several others for regulating the feed. The devices must be so constructed and arranged that the forward feed shall be regulated by the advance of the drill-bar; and immediately after the regulating device has been operated the devices must permit the carriage Z Z to move forward by the reaction of the motor in the cylinder.

What we claim as new, and desire to secure by Letters Patent, is—

1. In a rock-drill, the construction and arrangement of a cylinder for driving a drill, one end of said cylinder serving as a tool-holder, and having suitable attachments for rotating the tool, or feeding it forward, or both combined, as herein described.

2. The click L L, rotating on an axis parallel to or somewhat inclined to the axis of the drill-bar, in combination with the ratchet M, as and for the purposes described.

3. In machines for working on stone in which the tool is reciprocated by an elastic motor in a cylinder, the combination of the cylinder, ways, and gripes O and Q, or other suitable devices for holding the machine to the ways, constructed and arranged essentially as set forth, that when the device O is freed from its hold at or near the end of the forward stroke by means of a projection on the drill-bar, the machine may be fed forward on the ways by the reaction of the motor in the cylinder during the back stroke of the drill-bar, and held in its advanced position by means of the device Q, substantially as described, and for the purposes set forth.

4. The combination of the gripe O, lever N, ways Y, and tappet *p*, as and for the purposes described.

5. The combination of the carriage Z, gripe Q, spring *d*, and ways Y, as and for the purposes described.

6. The tool-holder, as described, consisting of the hollow cone P and wedges G G, constructed and arranged as described.

STILLMAN W. ROBINSON.
DE VOLSON WOOD.

Witnesses for STILLMAN W. ROBINSON:
R. E. MOORE,
J. BELLANGEE.

Witnesses for DE VOLSON WOOD:
ZINA P. KING,
B. C. FRENCH.